United States Patent
Lin

(10) Patent No.: US 11,088,783 B2
(45) Date of Patent: Aug. 10, 2021

(54) COMMUNICATION METHOD, TERMINAL AND NETWORK DEVICE

(71) Applicant: GUANGDONG OPPO MOBILE TELECOMMUNICATIONS CORP., LTD., Guangdong (CN)

(72) Inventor: Yanan Lin, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/333,783

(22) PCT Filed: Nov. 4, 2016

(86) PCT No.: PCT/CN2016/104707
§ 371 (c)(1),
(2) Date: Mar. 15, 2019

(87) PCT Pub. No.: WO2018/082043
PCT Pub. Date: May 11, 2018

(65) Prior Publication Data
US 2019/0260510 A1 Aug. 22, 2019

(51) Int. Cl.
*H04L 1/00* (2006.01)
*H04L 5/00* (2006.01)
*H04W 72/04* (2009.01)

(52) U.S. Cl.
CPC .......... *H04L 1/0067* (2013.01); *H04L 5/0005* (2013.01); *H04W 72/04* (2013.01); *H04W 72/0413* (2013.01); *H04W 72/0446* (2013.01)

(58) Field of Classification Search
None
See application file for complete search history.

(56) References Cited

U.S. PATENT DOCUMENTS

2008/0253326 A1* 10/2008 Damnjanovic ....... H04L 1/0006
370/329
2009/0116434 A1 5/2009 Lohr et al.
(Continued)

FOREIGN PATENT DOCUMENTS

| CN | 101790133 A | 7/2010 |
|---|---|---|
| CN | 102083213 A | 6/2011 |

(Continued)

OTHER PUBLICATIONS

First Office Action of the Chinese application No. 201680089827.1, dated Apr. 16, 2020.
(Continued)

*Primary Examiner* — Bunjob Jaroenchonwanit

(57) ABSTRACT

The present application provides a communication method, a terminal, and a network device. The communication method in the present application comprises: a terminal receives first indication information sent by a network device, the first indication information being used for indicating a first resource; and the terminal sends, according to the first indication information, an uplink channel or an uplink signal to the network device by using a third resource within the second resource, the third resource being a resource that is located in the second resource and that is not overlapped with the first resource. The communication method, the terminal and the network device provided in the present application can flexibly improve the utilization rate of resources.

17 Claims, 4 Drawing Sheets a network device transmits first indication information to a terminal, the first indication information being configured to indicate a first resource — S310 the network device receives an uplink channel or an uplink signal transmitted by the terminal with a third resource in a second resource according to the first indication information, the third resource being a resource in the second resource non-overlapped with the first resource — S320

(56) References Cited

U.S. PATENT DOCUMENTS

| | | | | |
|---|---|---|---|---|
| 2011/0151914 | A1* | 6/2011 | Leng | H04W 72/0413 |
| | | | | 455/509 |
| 2012/0003981 | A1* | 1/2012 | Krishnamurthy | H04W 72/04 |
| | | | | 455/450 |
| 2014/0010182 | A1* | 1/2014 | Chunli | H04L 5/0048 |
| | | | | 370/329 |
| 2014/0050128 | A1* | 2/2014 | Campoy Cervera | |
| | | | | H04W 72/0426 |
| | | | | 370/280 |
| 2014/0112282 | A1* | 4/2014 | Wijting | H04W 72/04 |
| | | | | 370/329 |
| 2015/0110033 | A1* | 4/2015 | Yi | H04L 5/0048 |
| | | | | 370/329 |
| 2015/0163823 | A1 | 6/2015 | Sadek et al. | |
| 2016/0345355 | A1* | 11/2016 | Andersson | H04W 74/0833 |
| 2017/0078135 | A1* | 3/2017 | Zeng | H04L 29/06 |
| 2017/0181131 | A1* | 6/2017 | Ahmadi | H04W 72/04 |
| 2017/0367084 | A1* | 12/2017 | Cheng | H04L 1/1854 |
| 2018/0123625 | A1* | 5/2018 | Lee | H04B 15/02 |
| 2018/0145796 | A1* | 5/2018 | Liang | H04L 1/1861 |
| 2018/0279281 | A1* | 9/2018 | Li | H04L 5/0053 |
| 2019/0075582 | A1* | 3/2019 | Kim | H04L 1/0029 |
| 2019/0239218 | A1* | 8/2019 | Wang | H04L 1/1861 |
| 2019/0373561 | A1* | 12/2019 | Yan | H04W 52/10 |
| 2020/0007290 | A1* | 1/2020 | Gong | H04J 11/005 |
| 2020/0163078 | A1* | 5/2020 | Jiang | H04L 5/0028 |
| 2020/0186393 | A1* | 6/2020 | Wang | H04L 5/0048 |
| 2020/0235961 | A1* | 7/2020 | Kim | H04B 17/20 |

FOREIGN PATENT DOCUMENTS

| | | |
|---|---|---|
| CN | 102316587 A | 1/2012 |
| EP | 2675081 A1 | 12/2013 |
| EP | 3496479 A1 | 6/2019 |
| JP | 2002247127 A | 8/2002 |
| JP | 2015527781 A | 9/2015 |
| RU | 2510596 C2 | 3/2014 |
| WO | 2013166670 A1 | 11/2013 |
| WO | 2014121511 A1 | 8/2014 |
| WO | 2016099345 A1 | 6/2016 |
| WO | 2016119687 A1 | 8/2016 |

OTHER PUBLICATIONS

Second Office Action of the Chinese application No. 201680089827.1, dated Jun. 22, 2020.
First Office Action of the Singaporean application No. 11201903067P, dated May 14, 2020.
First Office Action of the Canadian application No. 3039934, dated Apr. 17, 2020.
Samsung, Qualcomm, Intel, Panasonic, InterDigital, Sony, Ericsson, NTT DOCOMO, Fujitsu, OPPO, CATT, CMCC. "WF on NR UL control channel", 3GPP TSG RAN WG1 Meeting #86bis R1-1610808, published on Oct. 18, 2016.
First Office Action of the Chilean application No. 201901174, dated Dec. 19, 2019.
International Search Report in international application No. PCT/CN2016/104707, dated May 2, 2017.
Written Opinion of the International Search Authority in international application No. PCT/CN2016/104707, dated May 2, 2017.
Supplementary European Search Report in the European application No. 16920674.5, dated Jul. 3, 2019.
English translation of the Written Opinion of the International Search Authority in the international application No. PCT/CN2016/104707, dated May 2, 2017.
First Office Action of the Brazilian application No. 1120190085750, dated Sep. 8, 2020.
Notice of Allowance of the Russian application No. 2019116234, dated Jul. 21, 2020.
First Office Action of the European application No. 16920674.5, dated Jan. 25, 2021.
Intel Corporation, "UL control channel mapping in time" 3GPP TSG RAN WG1 Meeting #86b R1-1609534, Lisbon, Portugal, Oct. 10-14, 2016.
MediaTek Inc.,"Discussion on UL control channel design" 3GPP TSG RAN WG1 Meeting #86bis R1-1609559 Lisbon, Portugal Oct. 10-14, 2016.
First Office Action of the Japanese application No. 2019-516655, dated Nov. 20, 2020.
First Office Action of the Indian application No. 201917012143, dated Nov. 6, 2020.
First Office Action of the Israeli application No. 265825, dated Dec. 2, 2020.
Office Action of the Taiwanese application No. 106137777, dated Jan. 29, 2021.
Second Written Opinion of the Singaporean application No. 11201903067P, dated Mar. 1, 2021.
First Office Action of the Indonesian application No. P00201904397, dated Apr. 26, 2021.

* cited by examiner

COMMUNICATION METHOD, TERMINAL AND NETWORK DEVICE

TECHNICAL FIELD

The disclosure relates to the field of communications, and in particular to a communication method, a terminal and a network device.

BACKGROUND

In a New Radio (NR) system such as 5th-Generation (5G), uplink channels or uplink signals with various time lengths may be supported between a terminal and a base station. For example, the terminal may transmit an uplink channel or an uplink signal by using a time domain symbol in a first time slot.

In the NR system, the base station generally reserves resources for transmitting a certain uplink channel or uplink signal for the terminal, resulting in that a great number of resource fragments exist in the NR system. Moreover, in the reserved resources, it is possible that only a small amount of resources are actually used for transmitting the original uplink channel or the original uplink signal.

If these resource fragments cannot be used by other channels or signals, the resources will be wasted, resulting in a low utilization rate of the resources.

SUMMARY

The disclosure provides a communication method, a terminal and a network device, which may flexibly improve the utilization rate of a resource.

According to a first aspect, the disclosure provides a communication method, which may include that, a terminal receives first indication information transmitted by a network device, the first indication information being used to indicate a first resource; and the terminal transmits, according to the first indication information, an uplink channel or an uplink signal to the network device on a third resource within a second resource, the third resource being a resource within the second resource non-overlapped with the first resource.

In the communication method of the disclosure, the terminal may transmit, according to the first indication information transmitted by the network device, the uplink signal or the uplink channel on the third resource non-overlapped with the first resource indicated by the first indication information in the second resource. Therefore, the terminal may flexibly use a resource within the second resource to transmit the uplink signal or the uplink channel according to the indication information of the network device, thus improving the utilization rate of the resource within the second resource.

In a possible implementation manner, the first indication information is used to indicate at least one of the following: a time domain position of the first resource, or a frequency domain position of the first resource.

In a possible implementation manner, the action that the terminal transmits, according to the first indication information, an uplink channel or an uplink signal to the network device on a third resource within a second resource, the third resource being a resource non-overlapped with the first resource within the second resource may include that, the terminal determines a first number of resource units in the second resource; the terminal performs rate matching for the uplink channel or the uplink signal according to the first number, to obtain an output sequence having a length of a first bit number, the first bit number being determined by the terminal according to the first number; the terminal modulates the output sequence to obtain a first number of modulated symbols; and the terminal maps the first number of modulated symbols to the resource units in the second resource, where the terminal drops modulated symbols mapped to first resource units in the first number of modulated symbols, and the first resource units are resource units in the second resource overlapped with the first resource.

In a possible implementation manner, that the terminal transmits, according to the first indication information an uplink channel or an uplink signal to the network device on a third resource within a second resource, the third resource being a resource within the second resource non-overlapped with the first resource may include that, the terminal determines a second number of first resource units in the second resource, the first resource units being resource units in the second resource non-overlapped with the first resource; the terminal performs rate matching for the uplink channel or the uplink signal according to the second number, to obtain an output sequence having a length of a second bit number, the second bit number being determined by the terminal according to the second number; the terminal modulates the output sequence to obtain a second number of modulated symbols; and the terminal maps the second number of modulated symbols to the second number of first resource units.

In a possible implementation manner, the first indication information is used to indicate N time domain symbols included in the first resource, where the N is a nonnegative integer. The action that the terminal transmits, according to the first indication information, an uplink channel or an uplink signal to the network device on a third resource within a second resource, the third resource being a resource within the second resource non-overlapped with the first resource may include that, the terminal transmits, according to the first indication information, the uplink channel or the uplink signal to the network device on the third resource within the second resource, where M time domain symbols included in the third resource exclude the N time domain symbols, M is a positive integer.

In a possible implementation manner, the action that a terminal receives first indication information transmitted by a network device may include that, the terminal receives downlink control information transmitted by the network device, where the downlink control information carries the first indication information, the downlink control information further carries second indication information, and the second indication information is used to instruct the terminal to transmit the uplink channel or the uplink signal.

In a possible implementation manner, the first resource is a resource used by the terminal or other terminals to transmit an uplink control channel, an uplink sounding signal, or a random access channel, and the uplink channel includes an uplink shared channel.

According to a second aspect, the disclosure provides a communication method, which may include that, a network device transmits first indication information to a terminal, the first indication information being used to indicate a first resource; and the network device receives an uplink channel or an uplink signal transmitted by the terminal on a third resource within a second resource according to the first indication information, the third resource being a resource within the second resource non-overlapped with the first resource.

In the communication method of the disclosure, the network device transmits the first indication information to the terminal, so that the terminal may transmit, according to the first indication information, the uplink signal or the uplink channel on the third resource, which is non-overlapped with the first resource and is indicated by the first indication information, within the second resource. Therefore, the terminal may flexibly use a resource within the second resource to transmit the uplink signal or the uplink channel according to the indication information of the network device, thus improving the utilization rate of the resource within the second resource.

In a possible implementation manner, the first indication information is used to indicate at least one of the following: a time domain position of the first resource, or a frequency domain position of the first resource.

In a possible implementation manner, the action that the network device receives an uplink channel or an uplink signal transmitted by the terminal on a third resource within a second resource according to the first indication information may include that, the network device acquires modulated symbols corresponding to the uplink channel or the uplink signal in resource units included in the second resource, where the number of the modulated symbols is equal to the number of the resource units included in the second resource, the network device drops modulated symbols acquired on first resource units, and the first resource units are resource units in the second resource overlapped with those in the first resource.

In a possible implementation manner, the action that the network device receives an uplink channel or an uplink signal transmitted by the terminal on a third resource within a second resource according to the first indication information may include that, the network device acquires modulated symbols corresponding to the uplink channel or the uplink signal on first resource units in resource units included in the second resource, where the number of the modulated symbols is equal to the number of the first resource units included in the second resource, and the first resource units are resource units in the second resource non-overlapped with those in the first resource.

In a possible implementation manner, the first indication information is used to indicate N time domain symbols included in the first resource, where the N is a nonnegative integer. The action that the network device receives an uplink channel or an uplink signal transmitted by the terminal on a third resource within a second resource according to the first indication information, the third resource being a resource non-overlapped with the first resource within the second resource may include that, the network device receives the uplink channel or the uplink signal transmitted by the terminal on the third resource within the second resource according to the first indication information, where M time domain symbols included in the third resource exclude the N time domain symbols, M is a positive integer.

In a possible implementation manner, the action that a network device transmits first indication information to a terminal may include that, the network device transmits downlink control information to the terminal, where the downlink control information carries the first indication information, the downlink control information further carries second indication information, and the second indication information is used to instruct the terminal to transmit the uplink channel or the uplink signal.

In a possible implementation manner, the first resource is a resource used by the terminal or other terminals to transmit an uplink control channel, an uplink sounding signal, or a random access channel, and the uplink channel includes an uplink shared channel.

According to a third aspect, the disclosure provides a terminal, which may include modules configured to execute the communication method in the first aspect or any possible implementation manner of the first aspect.

According to a fourth aspect, the disclosure provides a network device, which may include modules configured to execute the communication method in the second aspect or any possible implementation manner of the second aspect.

According to a fifth aspect, the disclosure provides a communication system, which may include the terminal in the third aspect and the network device in the fourth aspect.

According to a sixth aspect the disclosure provides a terminal, which may include a receiver, a transmitter, a processor and a memory; the memory is configured to store codes; the processor is configured to execute the codes in the memory; the receiver and the transmitter are configured to communicate with other devices; when the codes are executed, the processor calls the receiver and the transmitter to implement the communication method in the first aspect or any possible implementation manner of the first aspect.

According to a seventh aspect, the disclosure provides a network device, which may include a receiver, a transmitter, a processor and a memory; the memory is configured to store codes; the processor is configured to execute the codes in the memory; the receiver and the transmitter are configured to communicate with other devices; when the codes are executed, the processor calls the receiver and the transmitter to implement the communication method in the second aspect or any possible implementation manner of the second aspect.

According to an eighth aspect, the disclosure provides a communication system, which may include the terminal in the sixth aspect and the network device in the seventh aspect.

According to a ninth aspect, the disclosure provides a computer readable medium; the computer readable medium stores program codes executed by a terminal; and the program codes include instructions used for executing the communication method in the first aspect or any possible implementation manner of the first aspect.

According to a tenth aspect, the disclosure provides a computer readable medium; the computer readable medium stores program codes executed by a network device; and the program codes include instructions used for executing the communication method in the second aspect or any possible implementation manner of the second aspect.

DETAILED DESCRIPTION

In order to understand conveniently, an exemplary architecture diagram of a communication system capable of implementing a communication method according to an embodiment of the disclosure is described overall first. It should be understood that the embodiments of the disclosure are not limited to the system architecture illustrated in FIG. 1. In addition, the apparatuses in FIG. 1 may be hardware devices, or may be software components divided from the perspective of functions, or may be a combination thereof.

Figure 1:
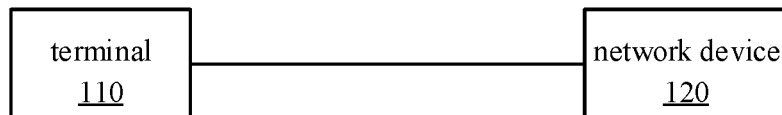
FIG. 1 illustrates a schematic system architecture diagram of a communication method that may be applied to the disclosure.

The communication system illustrated in FIG. 1 includes a terminal 110 and a network device 120. The terminal 110 and the network device 120 may communicate with each other.

In this embodiment of the disclosure, the terminal 110 may also be called a User Equipment (UE). The UE may communicate with one or more core networks via a Radio Access Network (RAN). The UE may also be called as an access terminal, a terminal device, a user unit, a user station, a mobile station, a mobile platform, a remote station, a remote terminal, a mobile device, a user terminal, a wireless communication device and a user proxy or user apparatus. The UE may be a cellular phone, a cordless telephone, a Session Initiation Protocol (SIP) phone, a Wireless Local Loop (WLL) station, a Personal Digital Assistant (PDA), a handheld device having a wireless communication function, a computing device or other processing devices, vehicle-amounted devices or wearable devices connected to a wireless modulator-demodulator, a terminal device in a future 5G network or the like.

In this embodiment of the disclosure, the network device 120 may be a Base Transceiver Station (BTS) in a Global System for Mobile communication (GSM) system or a Code Division Multiple Access (CDMA) system, or may be a NodeB in a Wideband Code Division Multiple Access (WCDMA) system, or may be an Evolutional Node B (eNB or eNodeB) in a Long Term Evolution (LTE) system or a base station device, a small base station device or the like in the future 5G network, all of which are not defined by the disclosure.

The terminal 110 and the network device 120 may transmit an uplink signal or an uplink channel by using one or more time domain symbols in a time slot, e.g., transmit a Physical Uplink Control Channel (PUCCH).

Figure 2:
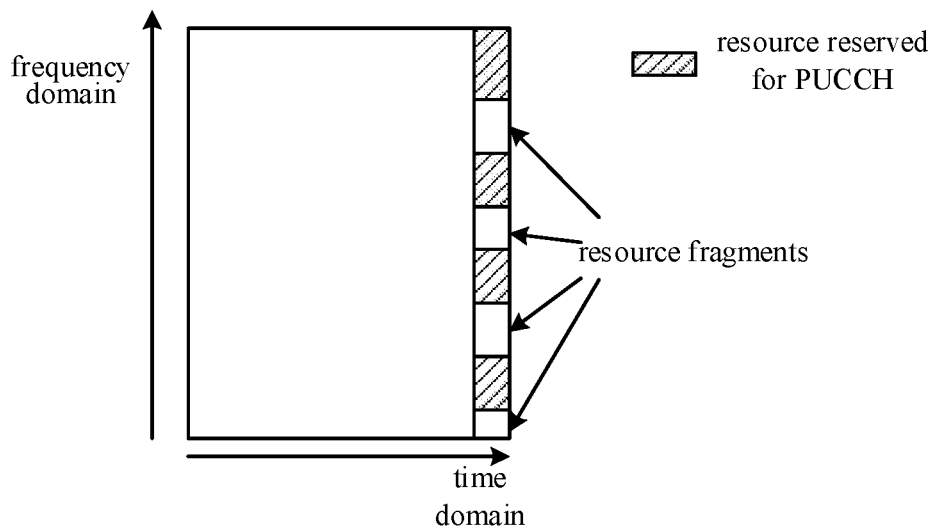
FIG. 2 illustrates a schematic diagram of resource allocation in a communication method according to an embodiment of the disclosure.

Generally, the network device 120 reserves a resource for transmitting a certain uplink signal or uplink channel for the terminal 110, e.g., reserves the resource for transmitting the PUCCH as illustrated in FIG. 2. As a result, a great number of resource fragments exist in the communication system. If these resource fragments cannot be used by other channels, the resources will be wasted, resulting in a low utilization rate of the resources.

In the communication system, resource reservation for a certain uplink signal or the uplink channel may cause all resources in time domain symbols included in the resource reserved for the uplink signal or the uplink channel unavailable to other uplink signals or uplink channels, and thus resource fragments in the time domain symbols included in the reserved resource are wasted, resulting in a low utilization rate of the resources.

Therefore, the disclosure proposes a new communication method, with which the terminal can utilize resource fragments to transmit the uplink channel or the uplink signal adequately and reasonably according to an indication of the network device, to improve the utilization rate of the resources.

Figure 3:
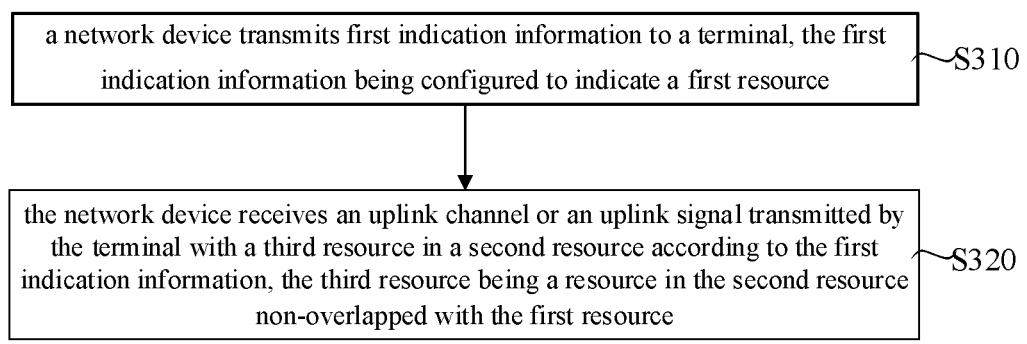
FIG. 3 illustrates a schematic flowchart of a communication method according to an embodiment of the disclosure.

FIG. 3 illustrates a schematic flowchart of a communication method according to an embodiment of the disclosure. It should be understood that, actions or operations of the communication method illustrated in FIG. 3 are merely examples. Other operations or variations of each operation in FIG. 3 may also be executed in this embodiment of the disclosure.

At S310, a network device transmits first indication information to a terminal. The first indication information is used to indicate a first resource.

At S320, the network device receives an uplink channel or an uplink signal transmitted by the terminal on a third resource within a second resource according to the first indication information. The third resource is a resource within the second resource non-overlapped with the first resource.

In the communication method of this embodiment of the disclosure, the network device transmits the first indication information indicating the first resource to the terminal, so that the terminal may transmit, according to the indication of the first indication information, the uplink channel or the uplink signal on the third resource within the second resource non-overlapped with the first resource. Therefore, the terminal may adequately utilize the resource within the second resource while avoiding using the first resource, and thus the utilization rate of the resource is improved.

Figure 4:
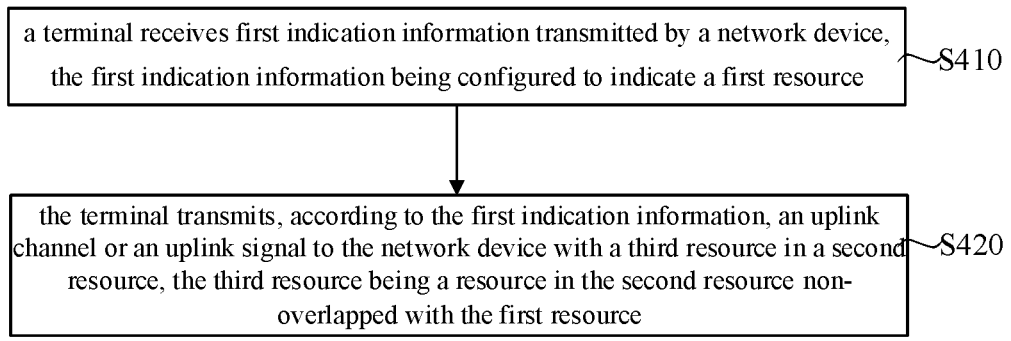
FIG. 4 illustrates a schematic flowchart of a communication method according to an embodiment of the disclosure.

Correspondingly, FIG. 4 illustrates the schematic flowchart of the communication method executed by the terminal in this embodiment of the disclosure. It should be understood that, actions or operations of the communication method illustrated in FIG. 4 are merely an example. Other operations or variations of each operation in FIG. 4 may also be executed in this embodiment of the disclosure.

At S410, a terminal receives first indication information transmitted by a network device. The first indication information is used to indicate a first resource.

At S420, the terminal transmits, according to the first indication information, an uplink channel or an uplink signal to the network device on a third resource within a second resource. The third resource is a resource within the second resource non-overlapped with the first resource.

In the communication method of this embodiment of the disclosure, the terminal receives the first indication information transmitted by the network device and indicating the first resource, so that the terminal may transmit, according to the indication of the first indication information, the uplink channel or the uplink signal on the third resource within the second resource non-overlapped with the first resource. Therefore, the terminal may adequately utilize the resource within the second resource while avoiding using the first resource, and thus the utilization rate of the resource is improved.

In the communication method illustrated in FIG. 3 and FIG. 4, the first resource may be a resource reserved by the network device for the terminal or other terminals to transmit the uplink signal or the uplink channel to the network device.

Specifically, the first resource may be a resource reserved by the network device for the terminal or other terminals to transmit an uplink control channel, an uplink sounding signal, or a random access channel to the network device. In other words, the first resource may be a resource used by the terminal or other terminals to transmit the uplink control channel, the uplink sounding signal, or the random access channel. E.g., the first resource may be a resource used by the terminal or other terminals to transmit the PUCCH, the Sounding Reference Signal (SRS), or Physical Random Access Channel (PRACH).

A specific example of the uplink channel in action S320 and action S420 is a Physical Uplink Shared Channel (PUSCH).

The second resource may be a resource that may be used by the terminal to transmit the uplink channel or the uplink signal, or a resource allocated for the terminal by the network device in advance and used for transmitting the uplink channel or the uplink signal.

The first indication information may be specifically used to indicate time domain symbols included in the first resource, or the first indication information may be specifically used to indicate a time domain position of the first resource and/or a frequency domain position of the first resource.

More specifically, the first indication information may be specifically used to indicate positions of the time domain symbols included in the first resource and/or the number of the time domain symbols included in the first resource.

If the terminal and the network device determine or set the positions of the time domain symbols included in the first resource in advance, e.g., the time domain symbols included in the first resource are last one or more time domain symbols in a time slot, to which the first resource belongs, the first indication information may only indicate the number of the time domain symbols included in the first resource. In this way, the terminal may also determine the positions of the time domain symbols included in the first resource according to the indication of the first indication information.

If the first indication information is used to indicate N time domain symbols included in the first resource, N is a nonnegative integer, generally, the network device may transmit the first indication information to the terminal in the following manner: the network device transmits downlink control information to the terminal, where the downlink control information carries the first indication information.

Correspondingly, the terminal may receive the first indication information transmitted by the network device in the following manner: the terminal receives the downlink control information transmitted by the network device, where the downlink control information carries the first indication information.

The downlink control information may specifically be Downlink Control Information (DCI).

Alternatively, the downlink control information may further carry second indication information, and the second indication information is used to instruct the terminal to transmit the uplink channel or the uplink signal.

In other words, the network device may transmit the downlink control information to the terminal, where the downlink control information carries the second indication information, and the second indication information is used for scheduling the terminal to transmit the uplink channel or the uplink signal. Meanwhile, the downlink control information further carries the first indication information, and the first indication information is used to indicate N time domain symbols included in the first resource. In this way, when the terminal receives the downlink control information, and transmits the uplink signal or the uplink channel according to the scheduling of the second indication information, the terminal may also determine, according to the indication of the first indication information, a resource that should be used for transmitting the uplink signal or the uplink channel, i.e., the third resource within the second resource non-overlapped with the first resource.

If N is equal to 0, it indicates that the terminal may use all resources within the second resource, i.e., the third resource may be the second resource.

Hereinafter, with the PUCCH and the PUSCH as an example, a schematic diagram of resource utilization in the communication method according to this embodiment of the disclosure is described in combination with FIG. 5 and FIG. 6.

Figure 5:
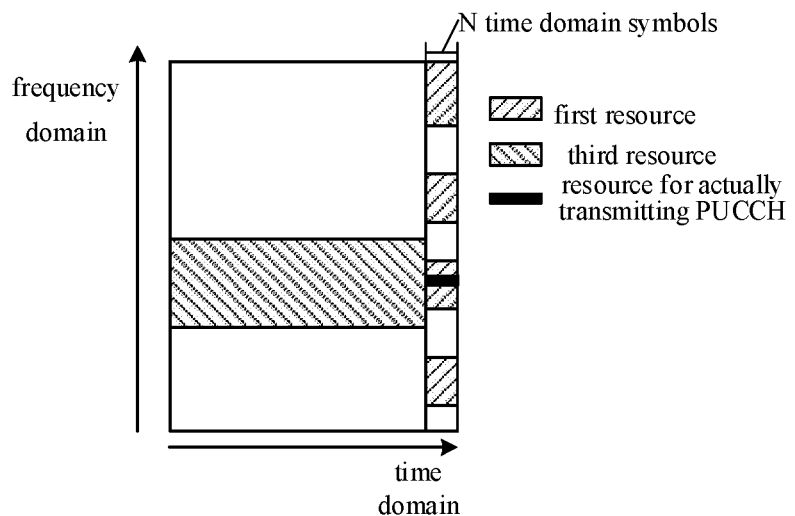
FIG. 5 illustrates a schematic diagram of resource allocation in a communication method according to an embodiment of the disclosure.

As illustrated in FIG. 5, if the first resource reserved by the network device for the PUCCH is really used by a corresponding terminal to transmit the PUCCH, the network device may transmit the first indication information to this terminal and/or other terminal to indicate N time domain symbols included in the first resource. In this way, after these terminals receive the first indication information, the third resource may be used to transmit the PUSCH, where the third resource includes time domain symbols other than the N time domain symbols.

Figure 6:
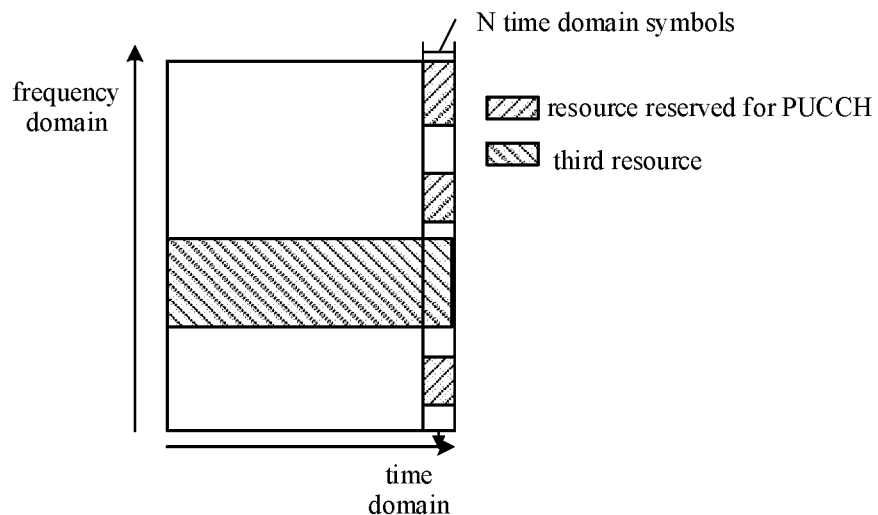
FIG. 6 illustrates a schematic diagram of resource allocation in a communication method according to an embodiment of the disclosure.

As illustrated in FIG. 6, if the resource reserved by the network device for the PUCCH is not really used by the corresponding terminal to transmit the PUCCH, although the resource reserved for the PUCCH includes N time domain symbols, the network device may also transmit the first indication information to this terminal and/or other terminals to indicate that the first resource includes no time domain symbol. In this way, after these terminals receive the first indication information, the third resource may be used to transmit the PUSCH, where the third resource may include the N time domain symbols included in the resource reserved for the PUCCH.

As can be seen directly from FIG. 5 and FIG. 6, in the communication method of this embodiment of the disclosure, the network device may transmit the indication information used to indicate the first resource, so that the terminal may utilize the resource reserved by the network device flexibly, reasonably and adequately, to transmit the uplink resource or the uplink channel, thus improving the utilization rate of the resource.

If the first indication information is specifically used to indicate the time domain position and/or the frequency domain position of the first resource, generally, the network device may transmit the first indication information to the terminal in the following manner: the network device transmits high-level signaling to the terminal, where the high-level signaling carries the first indication information.

At this moment, in the action S420, the uplink channel or the uplink signal transmitted by the terminal may be an uplink channel or an uplink signal scheduled by the network device via the downlink control information such as a PUSCH, or may be a semi-static uplink channel or an uplink signal such as a semi-static PUSCH, or may be an uplink channel or an uplink signal not scheduled.

Alternatively, if the first indication information is used to indicate the N time domain symbols included in the first resource, in the action S420 of the communication method illustrated in FIG. 4, the action that the terminal transmits, according to the first indication information, the uplink channel or the uplink signal to the network device on the third resource within the second resource, the third resource being a resource non-overlapped with the first resource within the second resource may include that, the terminal transmits, according to the first indication information, the uplink channel or the uplink signal to the network device on the third resource within the second resource, where M time domain symbols included in the third resource exclude the N time domain symbols, M is a positive integer.

Correspondingly, in the action S320 of the communication method illustrated in FIG. 3, the action that the network device receives an uplink channel or an uplink signal transmitted by the terminal on a third resource within a second resource according to the first indication information may include that, the network device receives the uplink channel or the uplink signal transmitted by the terminal on the third resource within the second resource according to the first indication information, where M time domain symbols included in the third resource exclude the N time domain symbols, M is a positive integer.

In other words, the network device may indicate the N time domain symbols included in the first resource of the terminal via the first indication information. In this way, the terminal may use, according to the indication of the first indication information, the third resource except for the N time domain symbols, to transmit the uplink signal or the uplink channel. Therefore, the method may avoid the terminal from using the first resource to transmit the uplink signal or the uplink channel, and thus avoid affecting other transmissions of the uplink signal or the uplink channel using the first resource.

Alternatively, if the first indication information is used to indicate the time domain position and/or the frequency domain position of the first resource, in the action S420 of the communication method illustrated in FIG. 4, the action that the terminal transmits, according to the first indication information, an uplink channel or an uplink signal to the network device on a third resource within a second resource, the third resource being a resource non-overlapped with the first resource within the second resource may include that, the terminal determines a first number of resource units in the second resource; the terminal performs rate matching for the uplink channel or the uplink signal according to the first number, to obtain an output sequence having a length of a first bit number, the first bit number being determined by the terminal according to the first number; the terminal modulates the output sequence, to obtain a first number of modulated symbols; and the terminal maps the first number of modulated symbols to the resource units in the second resource, where the terminal drops modulated symbols mapped to first resource units in the first number of modulated symbols, and the first resource units are resource units in the second resource overlapped with those in the first resource.

Correspondingly, in the action S320 of the communication method illustrated in FIG. 3, the action that the network device receives an uplink channel or an uplink signal transmitted by the terminal on a third resource within a second resource according to the first indication information may include that, the network device acquires modulated symbols corresponding to the uplink channel or the uplink signal in resource units included in the second resource, where the number of the modulated symbols is equal to the number of the resource units included in the second resource, the network device drops modulated symbols acquired on first resource units, and the first resource units are resource units in the second resource overlapped with those in the first resource.

The first number of the resource units in the second resource is the number of the resource units in the second resource.

Specifically, the terminal may firstly determine the number of resource units which are included in the second resource and used for transmitting the uplink signal or the uplink channel. Then, the terminal performs the rate matching for the uplink signal or the uplink channel according to the number of the resource units included in the second resource, to obtain the output sequence. The bit number of the output sequence is relevant to the number of the resource units included in the second resource, or the bit number of the output sequence is determined by the terminal according to the number of the resource units included in the second resource. The terminal modulates the output sequence to obtain a certain number of modulated symbols, where the number of the modulated symbols is equal to the number of the resource units included in the second resource.

In other words, if the number of the resource units included in the second resource is the first number and the bit number of the output sequence is a first bit number, the first bit number is determined by the terminal according to the first number and the number of the modulated symbols is equal to the first number.

Then, the terminal maps the first number of modulated symbols to the resource units included in the second resource. The specific mapping process is as follows: the terminal maps any one of the first number of modulated symbols to a resource unit in the second resource. If the resource unit, to which the modulated symbol is to be mapped, is a resource unit in a resource within the second resource overlapped with the first resource, the terminal drops the modulated symbol, i.e., the modulated symbol is not mapped to the resource unit. When a resource unit, to which the modulated symbol is to be mapped, is a resource the second resource non-overlapped with the first resource, the modulated symbol is mapped to this corresponding resource unit.

In this way, although the first number of modulated symbols for the uplink signal or the uplink channel are mapped to the first number of resource units in the second resource, as a matter of fact, the modulated symbols for the uplink signal or the uplink channel are not mapped to the resource units that are overlapped in the second resource and the first resource, and the modulated symbols for the uplink signal or the uplink channel are only mapped to the resource units in the second resource that are non-overlapped with the first resource. At this moment, the resource units in the second resource that are non-overlapped with the first resource form the third resource. Such a resource mapping process may also be called punching.

Assuming that the first number of resource units in the second resource is k and the number of the resource units in the second resource that are overlapped with the first resource is s, when the k modulated symbols for the uplink signal or the uplink channel are mapped to the k resource units, the modulated symbols for the uplink signal or the uplink channel are not mapped to the s resource units in the k resource units in fact.

According to the resource mapping process in the method for transmitting the uplink signal or the uplink channel with the first resource indicated by the first indication information, when the terminal transmits the uplink signal or the uplink channel, resource fragments related to the first resource may be adequately utilized, while the first resource is not taken up thus transmission of other uplink signals or uplink channels would not be affected.

It is to be noted that, the action that the network device drops the modulated symbols acquired on the first resource units includes that, the network device drops, when acquiring modulation sequence numbers carried on resource units of the second resource to obtain corresponding uplink channels or uplink signals, the modulated symbols acquired on the first resource units. However, the modulated symbols actually carried on the first resource units may be used for acquiring other uplink signals or uplink channels.

Alternatively, if the first indication information is used to indicate the time domain position and/or the frequency domain position of the first resource, in the action S420 of the communication method illustrated in FIG. 4, the action that the terminal transmits, according to the first indication information, an uplink channel or an uplink signal to the network device on a third resource within a second resource, the third resource being a resource non-overlapped with the first resource within the second resource may include that the following. The terminal determines a second number of first resource units in the second resource, the first resource units being resource units in the second resource non-overlapped with those in the first resource. The terminal performs rate matching for the uplink channel or the uplink signal according to the second number to obtain an output sequence having a length of a second bit number, the second bit number being determined by the terminal according to the second number. The terminal modulates the output sequence to obtain a second number of modulated symbols. The terminal maps the second number of modulated symbols to the second number of first resource units.

Correspondingly, in the action S320 of the communication method illustrated in FIG. 3, the action that the network device receives an uplink channel or an uplink signal transmitted by the terminal on a third resource within a second resource according, to the first indication information may include that, the network device acquires modulated symbols corresponding to the uplink channel or the uplink signal on first resource units in resource units included in the second resource, where the number of the modulated symbols is equal to the number of the first resource units included in the second resource, and the first resource units are resource units in the second resource non-overlapped with those in the first resource.

The second number of first resource units in the second resource is the number of the first resource units in the second resource.

Specifically, the terminal may firstly determine the number (for the convenience of subsequent description, this number is called the second number) of resource units in the second resource, which are non-overlapped with the first resource and used for transmitting the uplink signal or the uplink channel (for the convenience of subsequent description, the non-overlapped resource units are called the first resource units). Then, the terminal performs the rate matching for the uplink signal or the uplink channel according to the second number, to obtain the output sequence. The bit number (for the convenience of subsequent description, this bit number is called a first bit number) of the output sequence is relevant to the second number, or the first bit number is determined by the terminal according to the second number. The terminal modulates the output sequence to obtain a certain number of modulated symbols, where the number of the modulated symbols is equal to the second number.

In other words, if the number of the first resource units in the second resource non-overlapped with the first resource is the second number, the first bit number is a bit number determined by the terminal according to the second number, and the number of the modulated symbols is equal to the second number.

Then, the terminal maps the second number of the modulated symbols to the second number of the first resource units included in the second resource. The specific mapping process is as follows: when the terminal is to map any one of the second number of the modulated symbols to a resource unit included in the second resource, if the resource unit, to which the modulated symbol is to be mapped, is a resource unit in a resource within the second resource overlapped with the first resource, the terminal skips over this resource unit and turns to determine whether the next resource unit is a resource unit in a resource within the second resource overlapped with the first resource. If the resource unit is determined to be a resource unit in the second resource non-overlapped with the first resource, i.e., a first resource unit, the terminal maps the modulated symbol to this corresponding resource unit.

In this way, the modulated symbols of the uplink signal or the uplink channel are only mapped to the first resource units in the second resource non-overlapped with the first resource. The resource units in the second resource that are non-overlapped with the first resource form the third resource.

Assuming the second number of the second resource units in the second resource is k, k modulated symbols of the uplink signal or the uplink channel may be mapped to the k first resource units.

Through the resource mapping process in the method for transmitting the uplink signal or the uplink channel with the first resource indicated by the first indication information, when the terminal transmits the uplink signal or the uplink channel, resource fragments related to the first resource may be adequately utilized, while the first resource is not taken up, thus transmission of other uplink signals or uplink channels would not be affected.

The communication method in the embodiments of the disclosure has been described above. Hereinafter, the terminal, the network device and the communication system in the embodiments of the disclosure will be described below.

Figure 7:
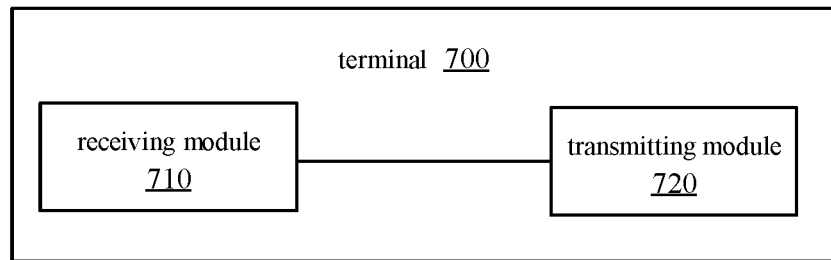
FIG. 7 illustrates a schematic structural diagram of a terminal according to an embodiment of the disclosure.

FIG. 7 illustrates a schematic structural diagram of a terminal 700 according to an embodiment of the disclosure. It should be understood that the terminal illustrated in FIG. 7 is merely an example. The terminal in this embodiment of the disclosure may further include other modules or units, or may include modules similar to the respective modules in FIG. 7 in terms of functions, or may not include all modules in FIG. 7.

A receiving module 710 is configured to receive first indication information transmitted by a network device. The first indication information is used to indicate a first resource.

A transmitting module 720 is configured to transmit, according to the first indication information, an uplink channel or an uplink signal to the network device on a third resource within a second resource. The third resource is a resource within the second resource non-overlapped with the first resource.

In this embodiment of the disclosure, the terminal may transmit, according to the first indication information transmitted by the network device, the uplink signal or the uplink channel on the third resource non-overlapped with the first resource within the second resource indicated by the first indication information, and thus the terminal may flexibly use a resource within the second resource to transmit the uplink signal or the uplink channel according to the indication information of the network device, to improve the utilization rate of the resource within the second resource.

Alternatively, in an embodiment, the first indication information is used to indicate at least one of the following: a time domain position of the first resource, or a frequency domain position of the first resource.

Alternatively, in an embodiment, the transmitting module is specifically configured to: determine a first number of resource units in the second resource; perform rate matching for the uplink channel or the uplink signal according to the first number, to obtain an output sequence having a length of a first bit number, the first bit number being determined by the terminal according to the first number; modulate the output sequence, to obtain a first number of modulated symbols; and map the first number of modulated symbols to the resource units in the second resource, drop modulated symbols mapped to first resource units in the first number of modulated symbols, the first resource units being resource units in the second resource overlapped with those in the first resource.

Alternatively, in an embodiment, the transmitting module is specifically configured to: determine a second number of first resource units in the second resource, the first resource units being resource units in the second resource non-overlapped with those in the first resource; perform rate matching for the uplink channel or the uplink signal according to the second number, to obtain an output sequence having a length of a second bit number, the second bit number being determined by the terminal according to the second number; modulate the output sequence to obtain a second number of modulated symbols; and map the second number of modulated symbols to the second number of first resource units.

Alternatively, in an embodiment, the first indication information is used to indicate N time domain symbols included in the first resource, where the N is a nonnegative integer. The transmitting module is specifically configured to: transmit, according to the first indication information, the uplink channel or the uplink signal to the network device on the third resource within the second resource, where M time domain symbols included in the third resource exclude the N time domain symbols, M is a positive integer.

Alternatively, in an embodiment, the receiving module is specifically configured to: receive downlink control information transmitted by the network device, where the downlink control information carries the first indication information, the downlink control information further carries second indication information, and the second indication information is used to instruct the terminal to transmit the uplink channel or the uplink signal.

Alternatively, in an embodiment, the first resource is a resource used by the terminal or other terminals to transmit an uplink control channel, an uplink sounding signal or a random access channel, and the uplink channel includes an uplink shared channel.

It should be understood that, the above and other operations and/or functions of each unit of the terminal 700 illustrated in FIG. 7 in this embodiment of the disclosure respectively implement corresponding processes of the communication method in FIG. 4, and will not be repeated here for the brief description.

Figure 8:
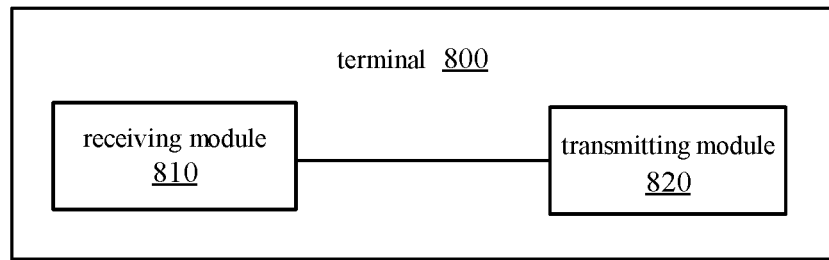
FIG. 8 illustrates a schematic structural diagram of a network device according to an embodiment of the disclosure.

FIG. 8 illustrates a schematic structural diagram of a network device 800 according to an embodiment of the disclosure. It should be understood that, the network device illustrated in FIG. 8 is merely an example. The network device in this embodiment of the disclosure may further include other modules or units, or include modules similar to the respective modules in FIG. 8 in terms of functions, or may not include all modules in FIG. 8.

A transmitting module 810 is configured to transmit first indication information to a terminal, the first indication information being used to indicate a first resource.

A receiving module 820 is configured to receive an uplink channel or an uplink signal transmitted by the terminal on a third resource within a second resource according to the first indication information, the third resource being a resource within the second resource non-overlapped with the first resource.

In this embodiment of the disclosure, the network device transmits the first indication information to the terminal, so that the terminal may transmit, according to the first indication information, the uplink signal or the uplink channel on the third resource, which is non-overlapped with the first resource and is indicated by the first indication information, in the second resource. Therefore, the terminal may flexibly use a resource within the second resource to transmit the uplink signal or the uplink channel according to the indication information of the network device, thus improving the utilization rate of the resource within the second resource.

Alternatively, in an embodiment, the first indication information is used to indicate at least one of the following: a time domain position of the first resource, or a frequency domain position of the first resource.

Alternatively, in an embodiment, the receiving module is specifically configured to acquire modulated symbols corresponding to the uplink channel or the uplink signal in resource units included in the second resource, where the number of the modulated symbols is equal to the number of the resource units included in the second resource. The receiving module is further configured to drop modulated symbols acquired on first resource units, where the first resource units are resource units in the second resource overlapped with the first resource.

Alternatively, in an embodiment, the receiving module is specifically configured to acquire modulated symbols corresponding to the uplink channel or the uplink signal in resource units included in the second resource, where the number of the modulated symbols is equal to the number of the resource units included in the second resource, and the first resource units are resource units in the second resource overlapped with the first resource.

Alternatively, in an embodiment, the first indication information is used to indicate N time domain symbols included in the first resource, where the N is a nonnegative integer. The receiving module is specifically configured to receive the uplink channel or the uplink signal transmitted by the terminal on the third resource within the second resource according to the first indication information, where M time domain symbols included in the third resource exclude the N time domain symbols, M is a positive integer.

Alternatively, in an embodiment, the transmitting module is specifically configured to transmit downlink control information to the terminal, where the downlink control information carries the first indication information, the downlink control information further carries second indication information, and the second indication information is used to instruct the terminal to transmit the uplink channel or the uplink signal.

Alternatively, in an embodiment, the first resource is a resource used by the terminal or other terminals to transmit an uplink control channel, an uplink sounding signal, or a random access channel, and the uplink channel includes an uplink shared channel.

It should be understood that, the above and other operations and/or functions of each unit of the network device 800 illustrated in FIG. 8 in this embodiment of the disclosure respectively implement corresponding processes of the communication method in FIG. 3, and will not be repeated here for the brief description.

Figure 9:
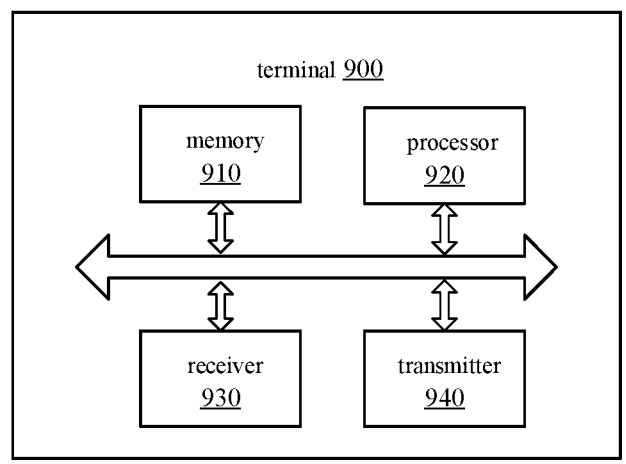
FIG. 9 illustrates a schematic structural diagram of a terminal according to an embodiment of the disclosure.

FIG. 9 illustrates a schematic structural diagram of a terminal 900 according to an embodiment of the disclosure. The terminal 900 may include a memory 910, a processor 920, a receiver 930 and a transmitter 940.

The memory 910 is configured to store a program.

The processor 920 is configured to execute the program stored by the memory 910.

The receiver 930 is called by the processor to receive first indication information transmitted by a network device, the first indication information being used to indicate a first resource.

The transmitter 940 is called by the processor 920 to transmit according to the first indication information, an uplink channel or an uplink signal to the network device on a third resource within a second resource, the third resource within the second resource being a resource non-overlapped with the first resource.

In this embodiment of the disclosure, the terminal may transmit, according to the first indication information transmitted by the network device, the uplink signal or the uplink channel on the third resource within the second resource non-overlapped with the first resource indicated by the first indication information. Therefore, the terminal may flexibly use a resource within the second resource to transmit the uplink signal or the uplink channel according to the indication information of the network device, thus improving the utilization rate of the resource within the second resource.

Alternatively, in an embodiment, the first indication information is used to indicate at least one of the following: a time domain position of the first resource, or a frequency domain position of the first resource.

Alternatively, in an embodiment, the transmitter is specifically configured to: determine a first number of resource units in the second resource; perform rate matching for the uplink channel or the uplink signal according to the first number, to obtain an output sequence having a length of a first bit number, the first bit number being determined by the terminal according to the first number; modulate the output sequence, to obtain a first number of modulated symbols; map the first number of the modulated symbols to the resource units in the second resource, and drop modulated symbols mapped to first resource units in the first number of the modulated symbols, where the first resource units in the second resource are resource units overlapped with the first resource.

Alternatively, in an embodiment, the transmitter is specifically configured to: determine a second number of first resource units in the second resource, the first resource units being resource units in the second resource non-overlapped with the first resource; perform rate matching for the uplink channel or the uplink signal according to the second number, to obtain an output sequence having a length of a second bit number, the second bit number being determined by the terminal according to the second number; modulate the output sequence to obtain a second number of modulated symbols; and map the second number of modulated symbols to the second number of first resource units.

Alternatively, in an embodiment, the first indication information is used to indicate N time domain symbols included in the first resource, where the N is a nonnegative integer. The transmitter is specifically configured to: transmit, according to the first indication information, the uplink channel or the uplink signal to the network device on the third resource within the second resource, where M time domain symbols included in the third resource exclude the N time domain symbols, M is a positive integer.

Alternatively, in an embodiment, the receiver is specifically configured to: receive downlink control information transmitted by the network device, where the downlink control information carries the first indication information, the downlink control information further carries second indication information, and the second indication information is used to instruct the terminal to transmit the uplink channel or the uplink signal.

Alternatively, in an embodiment, the first resource is a resource used by the terminal or other terminals to transmit an uplink control channel, an uplink sounding signal, or a random access channel, and the uplink channel includes an uplink shared channel.

It should be understood that, the terminal illustrated in FIG. 9 in this embodiment of the disclosure may correspond to the terminal illustrated in FIG. 9; and the above and other operations and/or functions of each unit of the terminal in this embodiment of the disclosure respectively implement corresponding processes of the communication method in FIG. 4, and will not be repeated here for the brief description.

Figure 10:
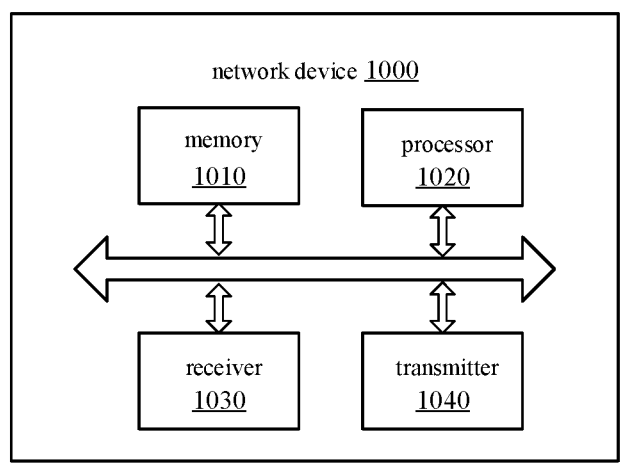
FIG. 10 illustrates a schematic structural diagram of a network device according to an embodiment of the disclosure.

FIG. 10 illustrates a schematic structural diagram of a network device 1000 according to an embodiment of the disclosure. The network device 1000 may include a memory 1010, a processor 1020, a receiver 1030 and a transmitter 1040.

The memory 1010 is configured to store a program.

The processor 1020 is configured to execute the program stored by the memory 1010.

The transmitter 1040 is called by the processor to transmit first indication information to the terminal, the first indication information being used to indicate a first resource.

The receiver 1030 is called by the processor to receive an uplink channel or an uplink signal transmitted by the terminal on a third resource within a second resource according to the first indication information, the third resource being a resource within the second resource non-overlapped with the first resource.

In this embodiment of the disclosure, the network device transmits the first indication information to the terminal, so that the terminal may transmit, according to the first indication information, the uplink signal or the uplink channel on the third resource, which is non-overlapped with the first resource and is indicated by the first indication information, in the second resource. Therefore, the terminal may flexibly use a resource within the second resource to transmit the uplink signal or the uplink channel according to the indication information of the network device, thus improving the utilization rate of the resource within the second resource.

Alternatively, in an embodiment, the first indication information is used to indicate at least one of the following: a time domain position of the first resource, or a frequency domain position of the first resource.

Alternatively, in an embodiment, the receiver is specifically configured to acquire modulated symbols corresponding to the uplink channel or the uplink signal in resource units included in the second resource, where the number of the modulated symbols is equal to the number of the resource units included in the second resource, drop modulated symbols acquired on first resource units, where the first resource units are resource units in the second resource overlapped with those in the first resource.

Alternatively, in an embodiment, the receiver is specifically configured to: acquire modulated symbols corresponding to the uplink channel or the uplink signal in resource units included in the second resource, where the number of the modulated symbols is equal to the number of the resource units included in the second resource, and the first resource units are resource units in the second resource overlapped with the first resource.

Alternatively, in an embodiment, the first indication information is used to indicate N time domain symbols included in the first resource, where the N is a nonnegative integer. The receiving module is specifically configured to receive the uplink channel or the uplink signal transmitted by the terminal on the third resource within the second resource according to the first indication information, where M time domain symbols included in the third resource exclude the N time domain symbols, M is a positive integer.

Alternatively, in an embodiment, the transmitter is specifically configured to transmit downlink control information to the terminal, where the downlink control information carries the first indication information, the downlink control information further carries second indication information, and the second indication information is used to instruct the terminal to transmit the uplink channel or the uplink signal.

Alternatively, in an embodiment, the first resource is a resource used by the terminal or other terminals to transmit an uplink control channel, an uplink sounding signal, or a random access channel, and the uplink channel includes an uplink shared channel.

It should be understood that, the network device illustrated in FIG. 10 in this embodiment of the disclosure may correspond to the network device illustrated in FIG. 10; and the above and other operations and/or functions of each unit of the terminal in this embodiment of the disclosure respectively implement corresponding processes of the communication method in FIG. 3, and will not be repeated here for the brief description.

It may be appreciated by a person of ordinary skill in the art that units and actions of algorithms in each example described in combination with embodiments disclosed in the disclosure may be implemented by electronic hardware or a combination of computer software and electronic hardware. Whether these functions are executed via a hardware manner or a software manner is determined by a specific application and a designed constraint condition of the technical solutions. A person skilled in the art may be implemented the described function by using different methods for each specific application. However, such implementation should not be considered as being beyond the scope of the disclosure.

The person skilled in the art may clearly understand that, for the convenience and briefness of description, the above-described specific working process of the system, the apparatus and the unit may be referred to the corresponding process of the foregoing method embodiment and will not be repeated here.

In some embodiments provided by the application, it should be understood that the disclosed system, apparatus and method may be implemented in other manners. For example, the apparatus embodiment described above is only schematic, and for example, division of the units is only logic function division, and other division manners may be adopted during practical implementation. For example, multiple units or components may be combined or integrated into another system, or some characteristics may be neglected or not executed. In addition, coupling, or direct coupling or communication connection between each displayed or discussed component may be indirect coupling or communication connection, implemented through some interfaces, of the apparatus or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each function unit in each embodiment of the disclosure may be integrated into a processing unit, each unit may also exist independently, and two or more than two unit may also be integrated into a unit. The integrated unit may be implemented in a hardware form, and may also be implemented in form of hardware and software function unit.

When being implemented in form of a software function unit and sold or used as an independent product, the functions may also be stored in a computer-readable storage medium. Based on such an understanding, the technical solutions of the embodiments of the disclosure substantially or parts making contributions to the conventional art may be embodied in form of software product, and the computer software product is stored in a storage medium, including a plurality of instructions configured to enable a piece of computer equipment (which may be a personal computer, a server, network equipment or the like) to execute all or part of the method in each embodiment of the disclosure. The above-mentioned storage medium includes: various media capable of storing program codes such as a U disk, a mobile hard disk, a ROM, a RAM, a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A communication method, comprising:
receiving, by a terminal, first indication information transmitted by a network device, the first indication information being used to indicate a first resource; and
transmitting, by the terminal, according to the first indication information, an uplink channel or an uplink signal to the network device on a third resource, the third resource being a resource within a second resource non-overlapped with the first resource,
wherein the first indication information is used to indicate N time domain symbols included in the first resource, N is a nonnegative integer; and
wherein the transmitting, by the terminal, according to the first indication information, the uplink channel or the uplink signal to the network device on the third resource comprises:

transmitting, by the terminal, the uplink channel or the uplink signal to the network device on the third resource,
wherein M time domain symbols included in the third resource exclude the N time domain symbols, M is a positive integer.

2. The communication method of claim 1, wherein the first indication information is used to indicate at least one of the following: a time domain position of the first resource, or a frequency domain position of the first resource.

3. The communication method of claim 2, wherein the transmitting, by the terminal, according to the first indication information, the uplink channel or the uplink signal to the network device on the third resource comprises:
determining, by the terminal, a first number of resource units in the second resource;
performing, by the terminal, rate matching for the uplink channel or the uplink signal according to the first number, to obtain an output sequence having a length of a first bit number, the first bit number being determined by the terminal according to the first number;
modulating, by the terminal, the output sequence, to obtain the first number of modulated symbols; and
mapping, by the terminal, the first number of modulated symbols to the resource units in the second resource, wherein the terminal drops modulated symbols, mapped to first resource units, in the first number of modulated symbols, and the first resource units are resource units in the second resource overlapped with the first resource.

4. The communication method of claim 2, wherein the transmitting, by the terminal, according to the first indication information, the uplink channel or the uplink signal to the network device on the third resource comprises:
determining, by the terminal, a second number of first resource units in the second resource, the first resource units being resource units in the second resource non-overlapped with the first resource;
performing, by the terminal, rate matching for the uplink channel or the uplink signal according to the second number, to obtain an output sequence having a length of a second bit number, the second bit number being determined by the terminal according to the second number;
modulating, by the terminal, the output sequence, to obtain the second number of modulated symbols; and
mapping, by the terminal, the second number of modulated symbols to the second number of first resource units.

5. The communication method of claim 1, wherein the receiving, by the terminal, first indication information transmitted by the network device comprises:
receiving, by the terminal, downlink control information transmitted by the network device,
wherein the downlink control information carries the first indication information.

6. The method of claim 5, wherein the downlink control information further carries second indication information; and the second indication information is used to instruct the terminal to transmit the uplink channel or the uplink signal.

7. The communication method of claim 1, wherein the first resource is a resource used by the terminal or other terminals to transmit an uplink control channel, an uplink sounding signal, or a random access channel, and the uplink channel comprises an uplink shared channel.

8. A terminal, comprising:
a processor; and
a memory storing program codes, which, when executed by the processor, cause the processor to perform one or more actions comprising:
receiving first indication information transmitted by a network device, the first indication information being used to indicate a first resource; and
transmitting, according to the first indication information, an uplink channel or an uplink signal to the network device on a third resource, the third resource being a resource in a second resource non-overlapped with the first resource,
wherein the first indication information is used to indicate N time domain symbols included in the first resource, N is a nonnegative integer; and
wherein the transmitting, according to the first indication information, the uplink channel or the uplink signal to the network device on the third resource comprises:
transmitting the uplink channel or the uplink signal to the network device on the third resource,
wherein M time domain symbols included in the third resource exclude the N time domain symbols, M is a positive integer.

9. The terminal of claim 8, wherein the first indication information is used to indicate at least one of the following: a time domain position of the first resource, or a frequency domain position of the first resource.

10. The terminal of claim 9, wherein transmitting, according to the first indication information, the uplink channel or the uplink signal to the network device on the third resource comprises:
determining a first number of resource units in the second resource;
performing rate matching for the uplink channel or the uplink signal according to the first number, to obtain an output sequence having a length of a first bit number, the first bit number being determined by the terminal according to the first number;
modulating the output sequence, to obtain the first number of modulated symbols; and
mapping the first number of modulated symbols to the resource units in the second resource, wherein modulated symbols, mapped to first resource units, in the first number of modulated symbols are dropped, and the first resource units are resource units in the second resource overlapped with the first resource.

11. The terminal of claim 9, wherein transmitting, according to the first indication information, the uplink channel or the uplink signal to the network device on the third resource comprises:
determining a second number of first resource units in the second resource, the first resource units being resource units non-overlapped with those in the first resource within the second resource;
performing rate matching for the uplink channel or the uplink signal according to the second number, to obtain an output sequence having a length of a second bit number, the second bit number being determined by the terminal according to the second number;
modulating the output sequence, to obtain a second number of modulated symbols; and
mapping the second number of modulated symbols to the second number of first resource units.

12. The terminal of claim 8, wherein receiving first indication information transmitted by the network device comprises: receiving downlink control information transmitted by the network device, wherein the downlink control information carries the first indication information.

13. The terminal of claim 12, wherein the downlink control information further carries second indication information; and the second indication information is used to instruct the terminal to transmit the uplink channel or the uplink signal.

14. The terminal of claim 8, wherein the first resource is a resource used by the terminal or other terminals to transmit an uplink control channel, an uplink sounding signal, or a random access channel, and the uplink channel comprises an uplink shared channel.

15. A network device, comprising:
a processor; and
a memory storing program codes, which, when executed by the processor, cause the processor to perform one or more actions comprising:
transmitting first indication information to a terminal, the first indication information being used to indicate a first resource; and
receiving an uplink channel or an uplink signal transmitted by the terminal on a third resource according to the first indication information, the third resource being a resource within the second resource non-overlapped with the first resource,
wherein the first indication information is used to indicate N time domain symbols included in the first resource, N is a nonnegative integer; and
wherein receiving the uplink channel or the uplink signal transmitted by the terminal on the third resource according to the first indication information comprises: receiving the uplink channel or the uplink signal transmitted by the terminal on the third resource, wherein M time domain symbols included in the third resource exclude the N time domain symbols, M is a positive integer.

16. The network device of claim 15, wherein the first indication information is used to indicate at least one of the following: a time domain position of the first resource, or a frequency domain position of the first resource.

17. The network device of claim 15, wherein the first resource is a resource used by the terminal or other terminals to transmit an uplink control channel, an uplink sounding signal, or a random access channel, and the uplink channel comprises an uplink shared channel.

* * * * *